United States Patent [19]

Patel

[11] 3,745,528

[45] July 10, 1973

[54] ERROR CORRECTION FOR TWO TRACKS IN A MULTI-TRACK SYSTEM

[75] Inventor: Arvind Motibhai Patel, Wappingers Falls, N.Y.

[73] Assignee: International Business Machines Corporation, Armonk, N.Y.

[22] Filed: Dec. 27, 1971

[21] Appl. No.: 212,544

[52] U.S. Cl. .......................................... 340/146.1 AL

[51] Int. Cl. .......................................... G06f 11/12

[58] Field of Search ......... 340/146.1 AL, 146.1 AV, 340/146.1 AQ, 172.5

[56] References Cited

UNITED STATES PATENTS

| | | | |
|---|---|---|---|
| 3,588,819 | 6/1971 | Tong | 340/146.1 AV |
| 3,629,824 | 12/1971 | Bossen | 340/146.1 AL |
| 3,675,200 | 7/1972 | Bossen | 340/146.1 AL |

*Primary Examiner*—Charles E. Atkinson
*Attorney*—W. N. Barret, Jr., Harold H. Sweeney, Jr., et al.

[57] ABSTRACT

A system for correcting two tracks in error in a multi-track data arrangement is provided. The message data $Z_1, Z_2, \ldots Z_k$ is encoded by adding two check bytes $C_1$ and $C_2$ thereto which are generated from the message data which is arranged in blocks of $k$ bytes, where each byte has $f$ bits of data arranged in a cross track direction, where $f = b \times m$ and $m$ and $b$ are integers $>1$ and $k$ is an integer $2<k<2^b$. The check bytes are generated in accordance with the equations:

$$C_1 = Z_1 \oplus Z_2 \oplus Z_3 \ldots \oplus Z_k$$

and $$C_2 = T^{\lambda} Z_1 \oplus T^{2\lambda} Z_2 \oplus \ldots \oplus T^{k\lambda} Z_k$$

where $T$ is the companion matrix of a binary primitive polynomial $g(x)$ of degree $f$ and $\lambda$ is an integer given by the expression:

$$t(2^f-1)/(2^b-1)$$

in which $t$ is any positive integer prime to $2^b-1$. The encoded message is decoded after usage (indicated by the ' symbol) by first and second shift registers which generate first and second syndromes from the encoded data in accordance with the equations:

$$S_1 = C_1' \oplus Z_1' \oplus Z_2' \oplus \ldots \oplus Z_k'$$

$$S_2 = C_2' \oplus T^{\lambda} Z_1' \oplus T^{2\lambda} Z_2' \oplus \ldots \oplus T^{k\lambda} Z_k'$$

Error pointers are provided for indicating the tracks in error and the bytes in error in the indicated tracks are corrected in accordance with the error patterns generated by processing the syndromes.

12 Claims, 12 Drawing Figures

ERROR CORRECTION FOR TWO TRACKS IN A MULTI-TRACK SYSTEM

BACKGROUND OF THE INVENTION

This invention relates to error detection and correction and, more particularly, to an improved error correcting code and system for detecting and correcting two tracks in error in a multi-track data arrangement.

In data communication systems as well as computers, the information can be coded by adding redundant bits to the data message in such a way that the message can be decoded with a practical amount of apparatus to obtain the original information corrected in the event an error has been introduced. Parallel data arrangements, that is, arrangements where the information is contained in parallel bytes arranged in a block of data, are used in computers and are well known especially in multi-channel recording apparatus. In co-pending application, Ser. No. 10,847, filed on Feb. 12, 1970, now U.S. Pat. No. 3,629,824, encoding and decoding apparatus are disclosed in which the redundant or check bits are associated with the data in a cross byte or cross track direction. This co-pending application sets forth a code capable of correcting one or more errors within a single, multiple bit byte of data. The data is divided into blocks which consist of $k$ bytes of data (each of $b$ bits), plus two check bytes, each of $b$ bits. The decoder is effective in recovering the data without error when not more than a single byte of the received message is in error no matter how many bits may be in error in the single byte. In U. S. Pat. No. 3,319,223, filed Mar. 31, 1964, an error correcting code is disclosed in which the check characters generated from the information are added serially to the message block. The coding and decoding is implemented by means of shift register circuits. Another co-pending application, Ser. No. 99,490, filed Dec. 18, 1970, now U.S. Pat. No. 3,697,948 utilizes the above-identified code but extends the capabilities thereof by combining therewith pointer signals which extend the error correcting capability of the arrangement to two bytes in error regardless of the number of bits in error in each byte.

It is an object of the present invention to provide an improved error control system in parallel data systems such as computer tape recording systems and similar multi-channel recording apparatus.

It is another object of the present invention to provide an error detection and correction system based on a new code which can be mechanized to provide two channel correction as well as detection of a large percentage of other errors without increasing the redundancy.

It is a further object of the present invention to provide an error detection and correction system in which larger size characters or bytes can be utilized without substantially increasing the encoding and decoding time and hardware.

It is a further object of the present invention to provide an error detection and correction code capable of providing correction for two tracks in error in a multichannel system when pointers for the tracks in error are provided.

It is another object of the present invention to provide an error detection and correction system in which all the necessary error correction functions can be realized by means of the same pair of shift registers.

The system for correcting two tracks in error in a multi-track data arrangement consists of an encoding means for generating two check bytes $C_1$ and $C_2$ for the message data $Z_1, Z_2, \ldots Z_k$ which is arranged in blocks having $k$ bytes where each byte has $f$ bits of data extending in a cross track direction where $f = b \times m$ where $b$ and $m$ are integers $>1$ and $k$ is an integer $2<k<2^b$. The check bytes are generated in accordance with the equations:

$$C_1 = Z_1 \oplus Z_2 \oplus Z_3 \ldots \oplus Z_k$$

and $$C_2 = T^{\lambda} \quad Z_1 \oplus T^{2\lambda} \quad Z_2 \oplus \ldots \oplus T^{k\lambda} \quad Z_k$$

where T is the companion matrix of a binary primitive polynomial $g(x)$ of degree $f$ and $\lambda$ is any integer given by the expression $t(2^f-1)/(2^b-1)$ in which t is any positive integer prime to $2^b-1$. The check bytes are appended to the incoming message data to obtain the encoded data for use in a multi-track data system. The encoded data is decoded after usage (indicated by the ' symbol) by means of first and second shift registers which generate first and second syndromes from the encoded data in accordance with the equations:

$$S_1 = C_1' + Z_1' \oplus Z_2' \oplus \ldots Z_k'$$

and $$S_2 = C_2' \oplus T^{\lambda} \quad Z_1' \oplus T^{2\lambda} \quad Z_2' \oplus \ldots \oplus T^{k\lambda} \quad Z_k'$$

Error pointers are provided which indicate the tracks in error and means are provided which locate the bytes in error in the tracks in error which can then be corrected in accordance wIth the errors indicated by the syndromes.

The foregoing and other objects, features and advantages of the invention, will be apparent from the following more particular description of a preferred embodiment of the invention, as illustrated in the accompanying drawings.

FIG. *6a* is a schematic diagram showing the logic network connections for generating the i pointers.

FIG. *6b* is a schematic logic diagram showing the generation of the Y parameter.

FIG. *6c* is a schematic logic diagram showing the generation of the X parameter.

FIG. *6d* is a schematic logic diagram for generating the control signals $N_0$, $N_1$ and $N_3$.

Figure 7:
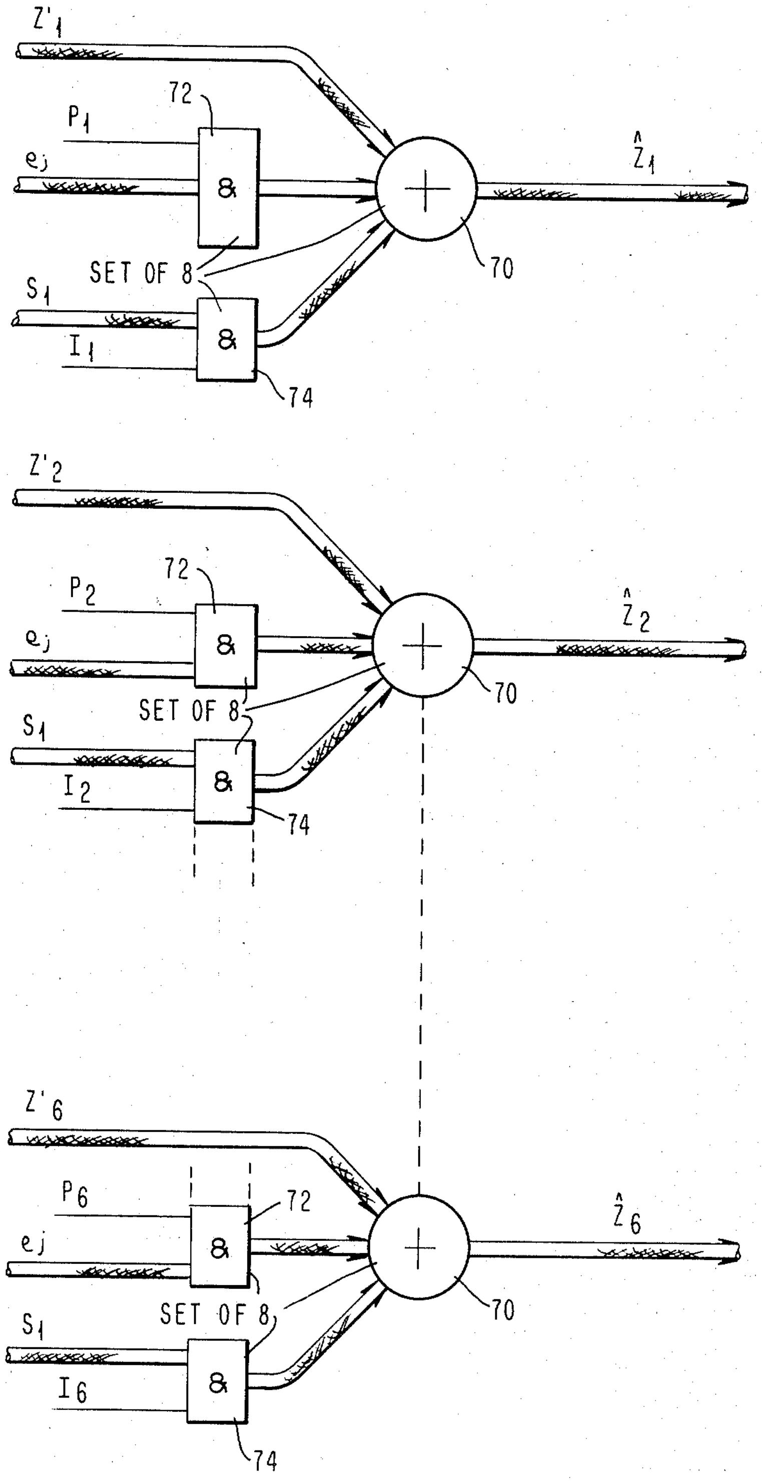

FIG. 7 is a schematic diagram showing the error corrector circuit of the decoder.

Figure 8:
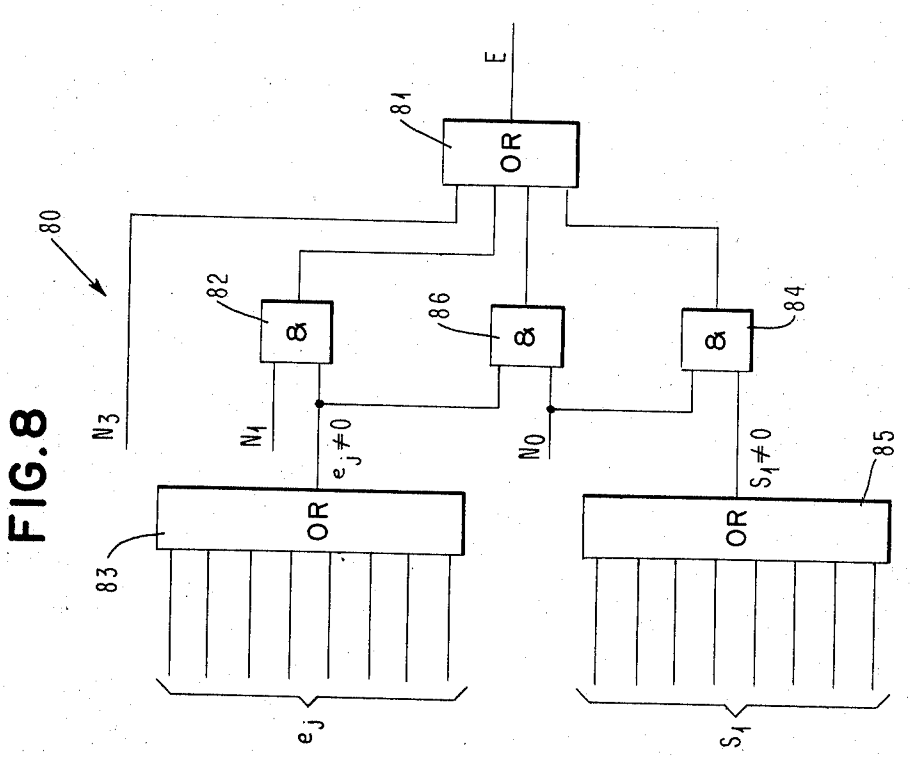

FIG. 8 is a schematic logic diagram showing the arrangement for the detection of a large percentage of uncorrectable errors.

It will be appreciated by those skilled in the art that this invention can be applied to Information Handling Systems of various capacities. The invention will, therefore, be first described in algebraic terms which are applicable to any size system and subsequently in terms of a specific system.

Figure 1:
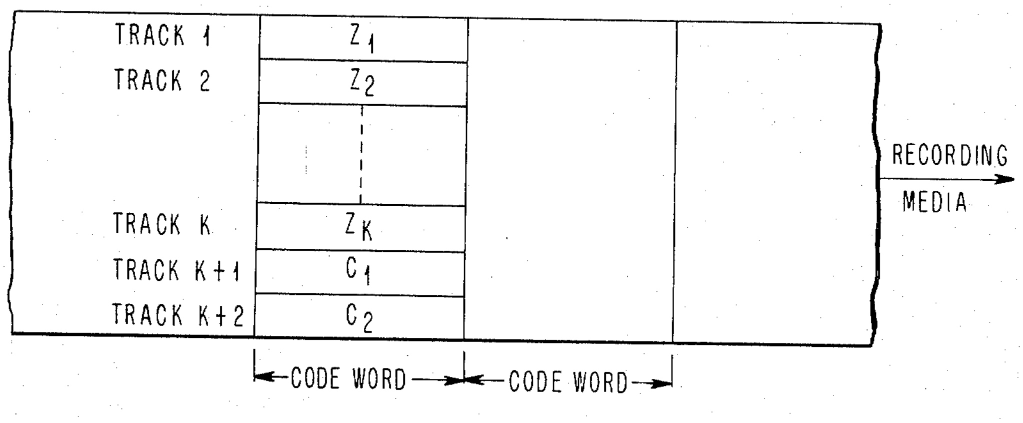
FIG. 1 is a schematic diagram showing the data arrangement in a multi-track data system.

Data is processed by the system in blocks consisting of $k$ bytes, each byte having $f$ bits of data where $f = b \times m$. Here and throughout, $b$ and $m$ designate integers $>1$ and $k$ is an integer $2<k<2^b$. The values of $f$ and $k$ are to be considered invariant for a particular embodiment, but are variously chosen for embodiments of various capacities. A block of data is accordingly designated $Z_1, Z_2, \ldots Z_k$ wherein $Z_1$ represents the first byte in the block, $Z_2$ the second byte, and so on to $Z_k$ which represents the $k^{th}$ and last byte. The encoder calculates from the block of incoming data two check bytes, (designated $C_1$ and $C_2$) each of $f$ bits and appends the check bytes to the $k$ data bytes to generate the sent message of $k+2$ bytes. The data format arrangement is shown in FIG. 1. The check bytes are added in separate tracks, parallel and adjacent to the tracks carrying the data bytes. Each byte $Z_i$ and $C_1$ and $C_2$ are $f$ bit column vectors in the mathematical equations throughout and can be explicitly written as:

$$Z_i = \begin{bmatrix} Z_i & (0) \\ Z_i & (1) \\ & \cdot \\ & \vdots \\ Z_i & (f-1) \end{bmatrix} \text{ and } C_i = \begin{bmatrix} C & (0) \\ C & (1) \\ & \cdot \\ & \vdots \\ C & (f-1) \end{bmatrix}$$

The check bytes $C_1$ and $C_2$ are computed from the information bytes $Z_1, Z_2, \ldots Z_k$ using the following matrix equations:

$$C_1 = Z_1 \oplus Z_2 \oplus \ldots \oplus Z_k \quad (1)$$

$$C_2 = T^{\lambda} \quad Z_1 \oplus T^{2\lambda} \quad Z_2 \oplus \ldots \oplus T^{k\lambda} \quad Z_k \quad (2)$$

wherein:

$\oplus$ denotes the modulo 2 vector sum;

$T$ is the companion matrix of a binary primitive polynomial $g(x)$ of degree $f$ which will be developed further as equation (3). For every $f$, there exists at least one primitive polynomial of degree $f$. For a list of primitive polynomials, see W. W. Petersen, *Error Correcting Codes*, M.I.T. Press, 1961.

$T^i$ is the $i^{th}$ power of the matrix $T$. (Computed using modulo 2 operations).

$\lambda$ is any integer given by the expression:

$t(2^f-1)/(2^b-1)$ in which t is any positive integer prime to $2^b-1$. Since $f = b \times m$, the above expression always results in a positive integer. The use of $\lambda$ in this code has particular significance, which will become apparent from the discussion with respect to the preferred embodiment to follow.

In order to more clearly explain the invention, a specific value $f = 8$ has been chosen. The polynomial $g(x)$ of degree 8 can be explicitly written as:

$$g(x) = g_0 + g_1 x \; g_2 x^2 + \ldots g_7 x^7 + g_8 x^8$$

where:

$g_0 = g_8 = 1$ and $g_i$ is either 0 or 1 for:
$i = 1, 2, \ldots 7$

The companion matrix $T$ of the polynomial $g(x)$ is defined as:

$$T = \begin{bmatrix} 0 & 0 & 0 & 0 & 0 & 0 & 0 & g_0 \\ 1 & 0 & 0 & 0 & 0 & 0 & 0 & g_1 \\ 0 & 1 & 0 & 0 & 0 & 0 & 0 & g_2 \\ 0 & 0 & 1 & 0 & 0 & 0 & 0 & g_3 \\ 0 & 0 & 0 & 1 & 0 & 0 & 0 & g_4 \\ 0 & 0 & 0 & 0 & 1 & 0 & 0 & g_5 \\ 0 & 0 & 0 & 0 & 0 & 1 & 0 & g_6 \\ 0 & 0 & 0 & 0 & 0 & 0 & 1 & g_7 \end{bmatrix} \quad (3)$$

As was mentioned previously in the Background of the Invention, co-pending application, Ser. No. 99,490, filed Dec. 18, 1970, now U.S. Pat. No. 3,697,948 discloses a multi-track error correction system having $k$ data tracks and two check byte tracks. Two $b$-digit check bytes are generated from $k$ $b$-digit information bytes where $2<k<2^b$. It will be appreciated that in this prior art system, the byte size b can be increased. However, the encoding and decoding hardware increases considerably with the increase in size of the bytes participating in the computation. Accordingly, these prior art arrangements have attempted to keep the byte size as small as possible while still satisfying the relation $2<k<2^b$.

There are a number of situations where an increase in the byte size participating in the code word computation is desirable. For example, in computer tape recording systems, dividing binary data tracks into 8-bit bytes is preferred because of the 8-bit byte organization of the main processor. Thus, an 8-bit byte error correction arrangement would be preferred to the 4-bit byte arrangement shown in the co-pending application.

The code generated in this invention is actually a shortened code which possesses an added capability of detecting a certain percentage of errors which cannot be corrected. The percentage R can be estimated as:

$$R\% = (1\text{-shortened length/full length}) \times 100\%$$

The full length is defined as $2^b+1$ and the shortened length is defined as $k+2$, i.e., the maximum number of tracks on which the code can be used versus the actual number of tracks. For example, when $k = 8$, using a 4-bit byte gives a detection capability estimated as 53 percent of the other errors as opposed to an estimated 97 percent with an 8-bit byte arrangement.

Although the code generated in this invention is actually a shortened form of a longer code, the encoding and decoding apparatus required is equivalent to that required for the shortened code rather than the longer code. Apparatus is also described for encoding and decoding this special code by means of which two tracks in error can be corrected when track pointers are provided. The actual code generated as a result of this invention can best be described through an example using 8-bit bytes. This arrangement will also be contrasted with the 4-bit byte arrangement of the prior art so that the advantages thereof can better be appreciated. The binary form of the parity check matrix for the 4-bit byte code in its full length is given by:

$$H = \begin{bmatrix} I_4 & I_4 & I_4 \ldots I_4 & I_4 & 0_4 \\ T_4 & T_4^2 & T_4^3 \ldots T_4^{15} & 0_4 & I_4 \end{bmatrix} \quad (4)$$

where $0_4$ and $I_4$ are $4 \times 4$ "zero" and "identity" matrices and $T_4$ is the companion matrix of a degree 4 primitive polynomial. One such polynomial is $1 + x^3 + x^4$. Accordingly, $T^4$ is given by:

$$T_4 = \begin{bmatrix} 0 & 0 & 0 & 1 \\ 1 & 0 & 0 & 0 \\ 0 & 1 & 0 & 0 \\ 0 & 0 & 1 & 1 \end{bmatrix} \quad (5)$$

Similarly, the parity check matrix for the 8-bit byte code in its full length is given by:

$$H = \begin{bmatrix} I_8 & I_8 & I_8 \ldots I_8 & I_8 & 0_8 \\ T_8 & T_8^2 & T_8^3 \ldots T_8^{255} & 0_8 & I_8 \end{bmatrix} \quad (6)$$

where $0_8$ and $I_8$ are 8 × 8 "zero" and "identity" matrices and $T_8$ is the companion matrix of the primitive polynomial $1 + x + x^3 + x^5 + x^8$.

$$T_8 = \begin{bmatrix} 0 & 0 & 0 & 0 & 0 & 0 & 0 & 1 \\ 1 & 0 & 0 & 0 & 0 & 0 & 0 & 1 \\ 0 & 1 & 0 & 0 & 0 & 0 & 0 & 0 \\ 0 & 0 & 1 & 0 & 0 & 0 & 0 & 1 \\ 0 & 0 & 0 & 1 & 0 & 0 & 0 & 0 \\ 0 & 0 & 0 & 0 & 1 & 0 & 0 & 1 \\ 0 & 0 & 0 & 0 & 0 & 1 & 0 & 0 \\ 0 & 0 & 0 & 0 & 0 & 0 & 1 & 0 \end{bmatrix} \quad (7)$$

Note that $T_4^i$ are elements of the Galois Field GF($2^4$) and $T_8^i$ are elements of the Galois Field GF($2^8$). These elements have the properties that $T_4, T_4^2, \ldots, T_4^{15}$ are all distinct and $T_4^{15}$ equals $I_4$ and $T_8, T_8^2, \ldots, T_8^{255}$ are all distinct and $T_8^{15}$ equals $I_8$. The Galois Field GF($2^8$) contains a subfield which is isomorphic to GF($2^4$). The elements of this subfield are given by:

$$T_8^{\lambda}, T_8^{2\lambda}, \ldots T_8^{15\lambda}$$

where:

$$\lambda = t(2^8-1)/(2^4-1)$$

for any $t$ prime to $(2^4-1)$. One such $\lambda$ is 68. These subfield elements have the property:

$$T_8^{\lambda}, T_8^{2\lambda}, \ldots T_8^{15\lambda}$$

are all distinct $T_8^{15\lambda} = I_8$. Furthermore, $T_8^{i\lambda}$ and $T_4^i$ possess a one-to-one relationship in that the two sets are isomorphic in the "Sum" and "Product" operations of the corresponding Galois Field. Referring to the 8-bit byte code given by the following parity check matrix:

$$H = \begin{bmatrix} I_8 & I_8 & I_8 \ldots I_8 & I_8 & 0_8 \\ T_8^{\lambda} & T_8^{2\lambda} & T_8^{3\lambda} \ldots T_8^{15\lambda} & 0_8 & I_8 \end{bmatrix} \quad (8)$$

It is apparent that this code possesses the same mathematical structure as that of the 4-bit byte code given by the parity check matrix of equation (4). All the columns in the matrix of equation (8) have an equivalent column in the matrix of equation (6). For example, with:

$$\lambda = 68,\ T_8^{5\lambda} = T_8^{340} = T_8^{255} \cdot T_8^{85} = T^{85}$$

Thus, it can be seen that the fifth column in equation (8) is equivalent to the 85th column in equation (6). It can be seen from the above, that the code constructed using the subfield elements $T^{i\lambda}$ is a shortened form of the code given by equation (6). The code can be further shortened in the usual manner. For example, the 8-track arrangement can be encoded using the parity check matrix:

$$H = \begin{bmatrix} I_8 & I_8 & I_8 & I_8 & I_8 & I_8 & I_8 & 0_8 \\ T_8^{\lambda} & T_8^{2\lambda} & T_8^{3\lambda} & T_8^{4\lambda} & T_8^{5\lambda} & T_8^{6\lambda} & 0_8 & I_8 \end{bmatrix} \quad (9)$$

Accordingly, for $\lambda = 68$, the $T_8^{\lambda}$ is given by:

$$T_8^{68} = \begin{bmatrix} 0 & 0 & 0 & 0 & 1 & 0 & 0 & 0 \\ 1 & 0 & 0 & 0 & 1 & 1 & 0 & 0 \\ 0 & 1 & 0 & 0 & 0 & 1 & 1 & 0 \\ 0 & 0 & 1 & 0 & 1 & 0 & 1 & 1 \\ 1 & 0 & 0 & 1 & 0 & 1 & 0 & 1 \\ 0 & 1 & 0 & 0 & 0 & 0 & 1 & 0 \\ 0 & 0 & 1 & 0 & 0 & 0 & 0 & 1 \\ 0 & 0 & 0 & 1 & 0 & 0 & 0 & 0 \end{bmatrix} \quad (10)$$

The preferred embodiment of this invention will be illustrated using the code defined in matrix (9) in an 8-track arrangement with 8-bit bytes. Accordingly, the two check bytes $C_1$ and $C_2$ are computed from the information bytes $Z_1, Z_2, Z_3, Z_4, Z_5, Z_6$ using the following equations:

$$C_1 = I_8 Z_1 \oplus I_8 Z_2 \oplus \ldots \oplus I_8 Z_6 \quad (11)$$

$$C_2 = T_8^{\lambda} Z_1 \oplus T_8^{2\lambda} Z_2 \oplus \ldots \oplus T_8^{6\lambda} Z_6 \quad (12)$$

After the message has been encoded and utilized at the recorder, the read message bytes are transmitted or conveyed to the decoder. The message is distributed by a read message distributor which sends the encoded message in parallel to a pair of shift registers SR1 and SR2. The decoder computes two expressions known as the syndrome $S_1$ and $S_2$ defined as:

$$S_1 = C_1' \oplus Z_1' \oplus Z_2' \oplus \ldots \oplus Z_k' \quad (13)$$

$$S_2 = C_2' \oplus T^{\lambda} Z_1' \oplus T^{2\lambda} Z_2' \oplus \ldots \oplus T^{k\lambda} Z_k' \quad (14)$$

The received message byte $Z_1', Z_2', \ldots Z_k', C_1', C_2'$ are the read message bytes corresponding to the recorded bytes $Z_1, Z_2, \ldots Z_k, C_1, C_2$, respectively. As was previously mentioned, there may be errors in up to two tracks causing errors in the corresponding bytes. These erroneous tracks are designated by track numbers $i$ and $j$ and are identified by pointer signals $P_i$ and $P_j$ in the form of logical "1." For convenience, it is required that $i \leq j$, $1 \leq i \leq k$ and $1 \leq j \leq k+2$. The case, where two indicated erroneous tracks are the check tracks, is ignored.

The "pointer" signals are derived from the system in which the error correction is taking place. Of course, there are various means of generating "pointer" signals such as is set forth in corresponding U. S. Pat. application, Ser. No. 40,836, filed May 26, 1970, entitled, "Enhanced Error Detection and Correction For Data Systems." In this application, the quality of the record/read back operations on a real time basis is used as pointers to possible error conditions.

The syndromes generated from the encoded data bytes and check bytes contain the error patterns. These error pattern bytes $e_i$ and $e_j$ in the bytes corresponding to the tracks $i$ and $j$ (when $i=j$, we assume $e_j=0$). $S_1$ and $S_2$ have the algebraic equivalent:

$$S_1 = \begin{cases} e_i \oplus e_j & \text{if } i < j < k+2 \\ e_i & \text{if } j = i \text{ or } k+2 \end{cases} \quad (15)$$

$$S_2 = \begin{cases} T^{i\lambda} \; e_i \oplus T^{j\lambda} \; e_j & \text{if } i<j<k+1 \\ T^{i\lambda} \; e_i & \text{if } j=i \text{ or } k+l \\ T^{i\lambda} \; e_i \oplus e_j & \text{if } j=k+2 \end{cases} \quad (16)$$

These expressions can be solved for $e_i$ and $e_j$ as follows:

$$e_j = T^{x\lambda} \; [S_1 \oplus T^{y\lambda} \; S_2] \qquad \text{if } j \neq k+2 \quad (17)$$

$$e_i = \begin{cases} S_1 \oplus e_j & \text{if } j \neq k+2 \\ S_1 & \text{if } j = k+2 \end{cases} \quad (18)$$

wherein:

$$T^{x\lambda} = \begin{cases} [T^{(j-i)\lambda} \; \oplus I]^{-1} & \text{if } i<j<k+1 \\ I & \text{if } j=i \text{ or } k+1 \end{cases} \quad (19)$$

and:

$$y = -i \text{ modulo } 2^b-1 \quad (20)$$

For each value $j-i$, the values of parameter $x$ and for each value of $i$, the parameter $y$ are fixed. These parameters can be computed algebraically. For example, in the preferred embodiment where $T^{\lambda} = T_8^{68}$ as given in equation (10), the values of $x$ and $y$ are tabulated in Tables 1 and 2.

TABLE 1.—PARAMETER $x$

| $j-i=$ | [1]0 | 1 | 2 | 3 | 4 | 5 |
|---|---|---|---|---|---|---|
| $x=$ | 0 | 3 | 6 | 11 | 12 | 5 |

[1] Or $j=k+l$.
Note.—$j \neq k+2$.

TABLE 2.—PARAMETER $y$

| $i=$ | 1 | 2 | 3 | 4 | 5 | 6 |
|---|---|---|---|---|---|---|
| $y=$ | 14 | 13 | 12 | 11 | 10 | 9 |

Using the above computed values of $x$ and $y$, the error pattern $e_j$ is computed from the syndromes $S_1$ and $S_2$ according to equation (17). The erroneous bytes $Z_i'$ and $Z_j'$ can then be corrected using the error pattern $e_j$ and the syndrome $S_1$ to produce the corrected bytes $\hat{Z}_i$ and $\hat{Z}_j$ since:

$$\hat{Z}_i = \begin{cases} Z_i' \oplus S_1 \oplus e_j & \text{if } j \neq k+2 \\ Z_i' \oplus S_1 & \text{if } j = k+2 \end{cases} \quad (21)$$

$$\hat{Z}_j = Z_j' \oplus e_j \quad (22)$$

In summary, the decoding process consists of:

1. Computing the syndromes $S_1$ and $S_2$ from the received message bytes $Z_1'$, $Z_2'$, . . . $Z_k'$, $C_1'$, $C_2'$ according to equations (3) and (4).

2. Computing the error pattern $e_j$ from the syndromes $S_1$ and $S_2$ according to equation (17) with proper values of parameters $x$ and $y$ from precalculated tables.

3. Correcting the erroneous bytes with the error pattern $e_j$ and the syndrome $S_1$ according to equations (21) and (22).

4. Detection of the uncorrectable errors according to the following:

4a. When more than two tracks are indicated as being in error, the code cannot provide reliable error correction.

4b. When two tracks are indicated as being in error, the error pattern bytes $e_i$ and $e_j$ have unique values.

4c. When exactly one track is indicated as being in error (the case where $i$ is equal to $j$), then the error pattern byte $e_j$ must be 0 in all bit positions. If the computed $e_j$ is not 0 in all bit positions, then this is interpreted as detection of some other errors.

4d. When no track is indicated as being in error, then the syndromes $S_1$ and $S_2$ and, consequently, the error pattern bytes $e_i$ and $e_j$ must be 0 in all bit positions. If not, this is interpreted as detection of errors.

Figure 2:
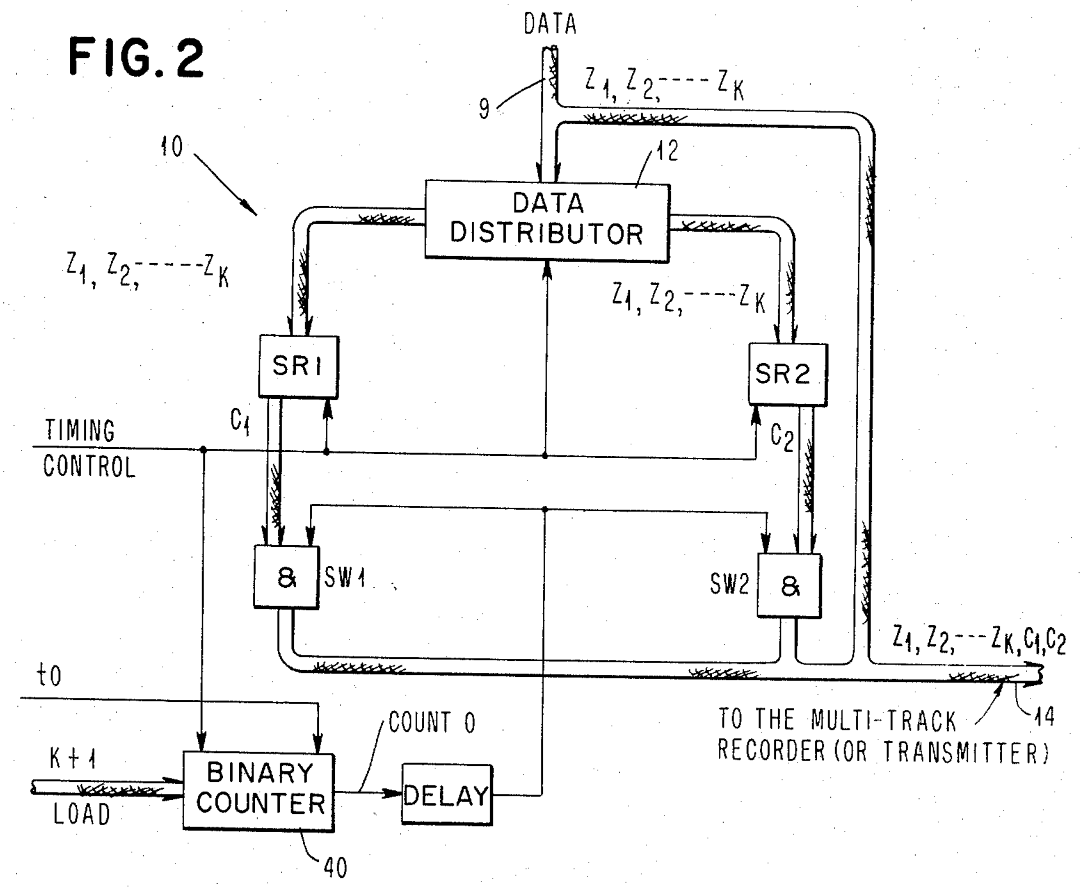
FIG. 2 shows a block diagram for carrying out the encoding of the present invention.
Figure 5:
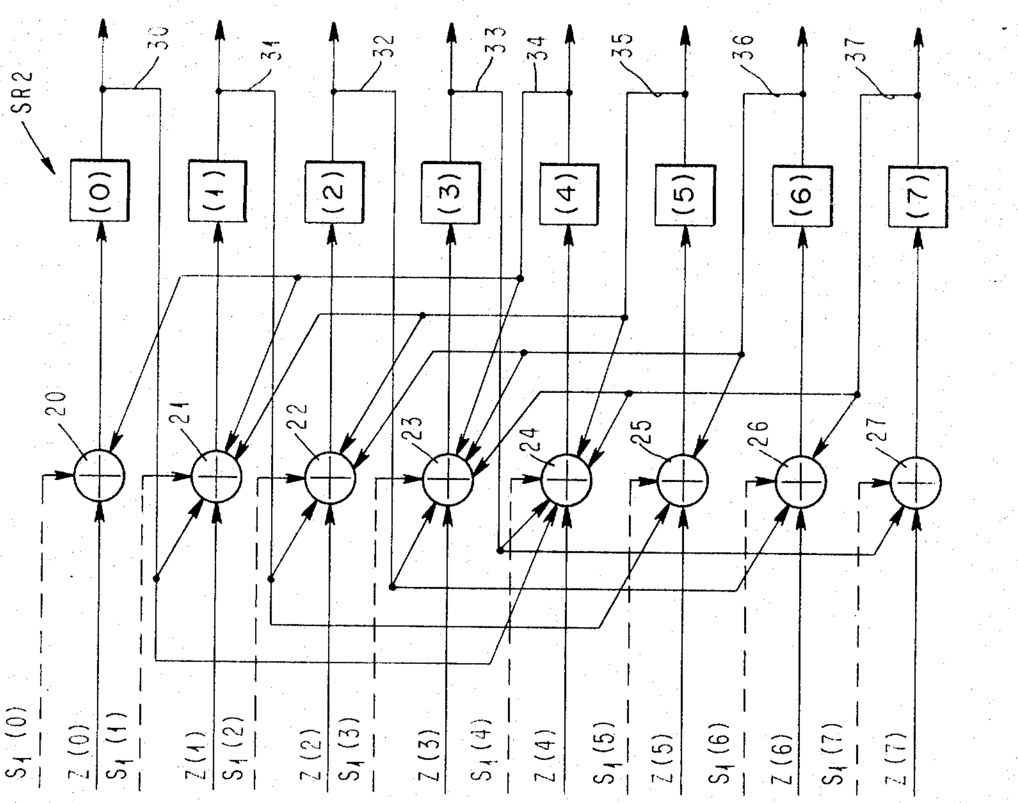
FIG. 5 is a further schematic diagram showing the second shift register of the pair of shift registers.
Figure 4:
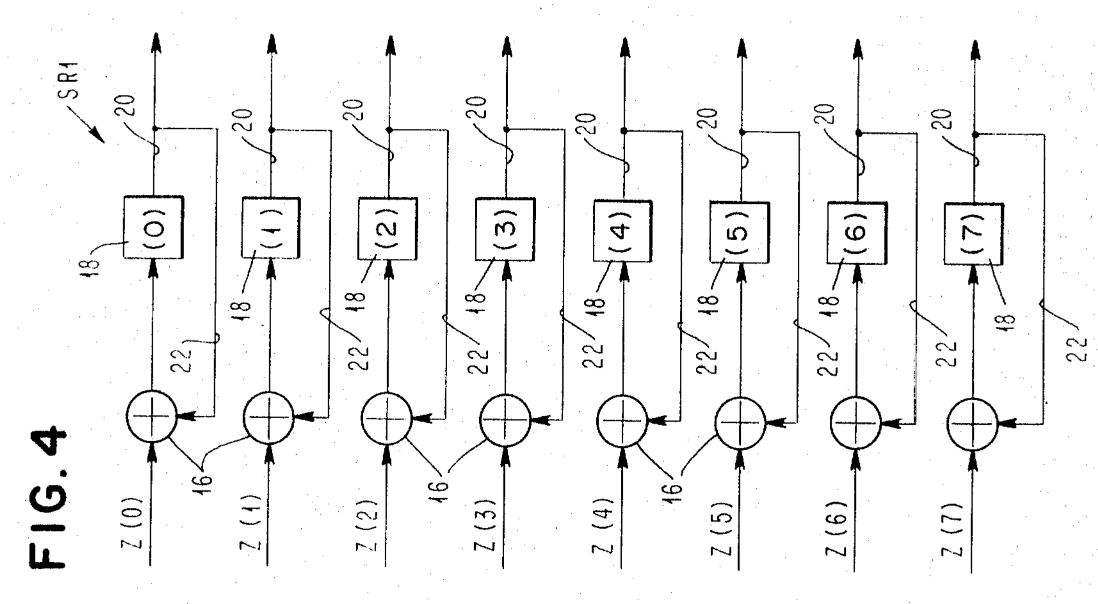
FIG. 4 is a schematic diagram showing the organization of the first shift register of the pair of shift registers used for encoding and decoding in the error correction system of the invention.

Utilizing the previous example of 8-bit bytes, it can be seen from FIG. 2, that the data $Z_1$, $Z_2$, . . . $Z_k$ in forms of blocks of equal size bytes is received at the input 9 of the encoder 10. The received data is distributed by a data distributor to shift registers SR1 and SR2. The distributor 12 applies the incoming data to these shift registers in parallel. The shift registers SR1, SR2 perform the computations previously described to generate the check bytes $C_1$ and $C_2$. These check bytes are appended to the message data at the output 14 of the encoder 10. This encoded data is sent to the multitrack recorder or transmitter for utilization. FIGS. 4 and 5 show the shift registers SR1 and SR2, respectively. Each shift register contains 8 binary storage elements (0) . . . (7) with appropriate feedback connections and modulo 2 summing networks at each input stage. It is implied that with a time control signal, the shift register shifts the contents while simultaneously receiving the new input. Shift register devices of this type are widely known and given the feedback connection, it can be physically constructed from available logic hardware in many different ways.

Referring to FIG. 4, each input bit Z(0) . . . Z(7) of the 8-bit byte is applied to a separate modulo 2 summing circuit 16 at the input to each of the eight separate shift register storage elements 18. The output 20 of each binary storage element 18 is fed back via a feedback connection 22 to the modulo 2 adding circuit 16 at the input thereto along with the new input.

In FIG. 5, each of the 8-bits Z(0) . . . Z(7) of an 8-bit byte are shown as inputs to the modulo 2 adder circuits 20 – 27 at the input to each storage element of the shift register. The outputs 30 – 37 of each of the binary storage elements (0) . . . (7) are connected to certain ones of the modulo 2 adder circuits 20 – 27 in accordance with the columns of the matrix $T_8^{68}$ which is given in equation (10). For example, the output 30 of the $0^{th}$ storage element is connected back to the modulo 2 adder circuits 21 and 24 at the inputs of the first and fourth stages of the shift register. These connections are made in accordance with the $0^{th}$ column of $T_8^{68}$ which has 1's in the first and fourth positions. The new 8-bit vector input is entered into the register via the modulo 2 adding circuits 20 – 27 simultaneously with the feedback mentioned. If an 8-digit byte X represents the present contents of shift register SR1 and shift register SR2 and Y representing the input is entered with a shifting operation; then the next contents in shift register SR1 is $Y \oplus X$ and in shift register SR2 is $Y \oplus T_8^{68} \cdot X$.

The information is entered into the shift registers SR1 and SR2 in reverse order, that is, $Z_k$ is entered first and $Z_1$ is entered last. After the last byte $Z_1$ has entered, the registers are shifted one more time with a 0 input.

The contents of shift register SR1 will be $Z_1 \oplus Z_2 \oplus \ldots \oplus Z_k$ which represents the first check byte. The contents of shift register SR2 will be $T^{\lambda}\ \ Z_1 \oplus T^{2\lambda}\ \ Z_2 \oplus \ldots \oplus T^{k\lambda}\ \ Z_k$ which is the second check byte. At the start time of the encoder 10, $t_0$, the binary counter 40 is set to $k+1$. The counter counts down in synchronism with the timing control signal. At count 0, the last shift of shift register SR1 and SR2 generates the respective check bytes. The count 0 signal obtained from the counter 40 closes the switches SW1 and SW2 after a unit time delay (during the next timing signal).

Figure 3:
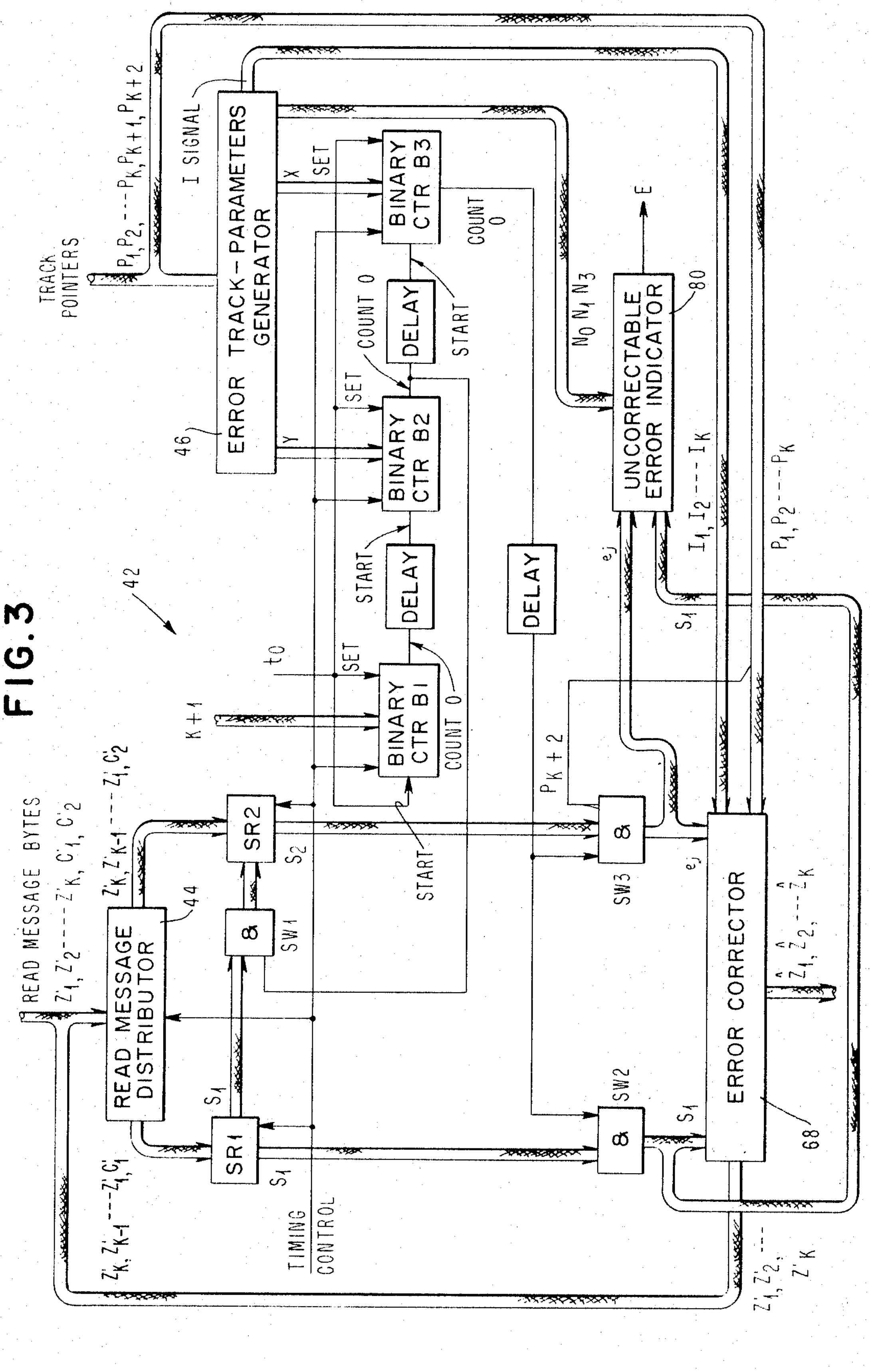
FIG. 3 is a schematic diagram showing the decoder arrangement for the present invention.

Referring to FIG. 3, the decoder 42 receives the encoded read or utilized message bytes $Z_1'$, $Z_2'$, . . . $Z_k'$, $C_1'$, $C_2'$ and the pointers $P_1$, $P_2$, . . . $P_k$, $P_{k+1}$, $P_{k+2}$ which indicate the tracks in error. The decoder 42 computes from these inputs the corrected data bytes $\hat{Z}_1$, $\hat{Z}_2$, . . . $\hat{Z}_k$ or generates an uncorrectable error signal E. The symbol ^ represents the corrected data.

The decoder 42 first computes the syndromes $S_1$ and $S_2$ in shift registers SR1 and SR2, as shown in FIGS. 4 and 5 from the read or received encoded message bytes $Z_1'$, $Z_2'$, . . . $Z_k'$, $C_1'$, $C_2'$ according to equations (3) and (4). The message bytes $Z_k'$, $Z_{k-1}'$ . . . $Z_1'$ are applied to the shift registers SR1 and SR2 in that order by the read message distributor 44. Of course, the decoding is being performed to correct any errors that may have been introduced to the message as a result of the utilization thereof, either in the recorder or in the transmission with respect thereto. As each byte of the input message is received at the shift registers SR1 and SR2, the registers are simultaneously shifted by means of a time control signal. After the byte $Z_1'$ has entered, the byte $C_1'$ is entered into shift register SR1 and the byte $C_2'$ is entered into shift register SR2 while shifting the registers once. The contents of shift register SR1 is now $C_1' \oplus Z_1' \oplus Z_2' \oplus \ldots \oplus Z_k'$ which is the syndrome $S_1$. The contents of shift register SR2 is now $C_2' \oplus T^{\lambda}\ \ Z_1'\ T^{2\lambda}\ \ Z_2' \oplus \ldots \oplus T^{k\lambda}\ \ Z_k'$ which is the syndrome $S_2$. The syndrome generation is controlled by the timing control signal. The binary counter $B_1$ is set to $k+1$ at time $t_0$ (starting time for the decoder) and counts down in synchronism with the timing control signals. At count 0, the last shift of shift registers SR1 and SR2 results in $S_1$ as the contents of the shift register SR1 and $S_2$ as the contents of shift register SR2.

The count 0 signal from the counter $B_1$ starts counter $B_2$ after a unit time delay, that is, with the next timing control signal. $B_2$ is set to the binary value $y$ at time $t_0$. Counter $B_2$ counts down in synchronism with the timing control signal which continuously shifts registers SR1 and SR2 also. At the count 0, in the counter $B_2$, the switch SW1 is closed. This causes the contents of shift register SR1 which is $S_1$ to enter shift register SR2. Accordingly, the contents of shift register SR2 is $S_1 \oplus T^{y\lambda}\ \ S_2$ and the contents of shift register SR1 remains $S_1$.

The count 0 signal generated by counter $B_2$ initiates $B_3$ after a unit time delay, that is, with the next timing control signal. Counter $B_3$ is set to the binary value $x$ at time $t_0$. Counter $B_3$ counts down in synchronism with the timing control signal which continuously shifts registers SR1 and SR2. At the count 0 in the counter $B_3$, the last shift of SR1 and SR2 produces $T^{x\lambda}\ \ (S_1 \oplus T^{y\lambda}\ \ S_2)$ as the contents of SR2 while the contents of shift register SR1 remains $S_1$.

The count 0 signal from the counter $B_3$ closes the switches SW2 and SW3 after a unit time delay (with the next timing control signal). The switch SW3 is also controlled by the pointer signal $P_{k+2}$ as described later in connection with the error corrector circuit.

Figure 6B:
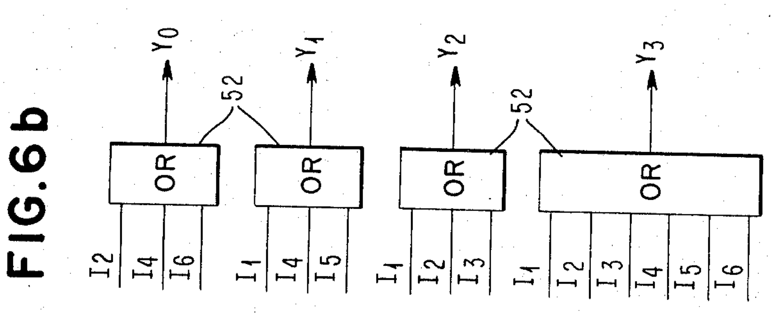
FIG. 6 shows the error track parameter generator used in the decoder which includes the FIGS. *6a*, *6b*, *6c* and *6d* in its overall arrangement.
Figure 6A:
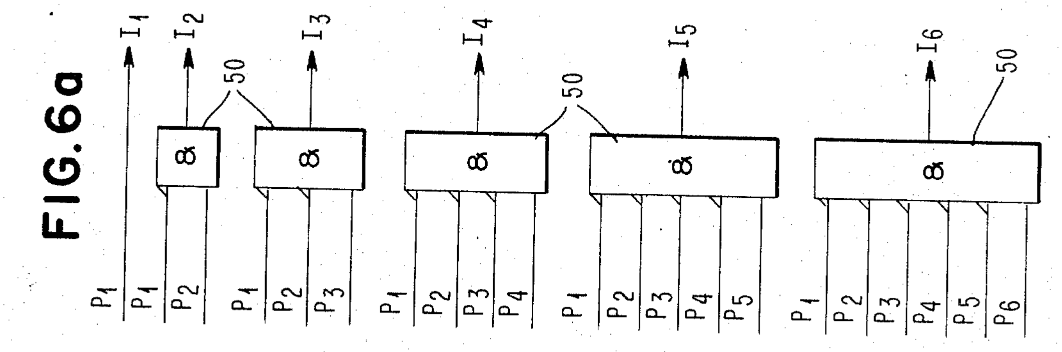
Figure 6C:
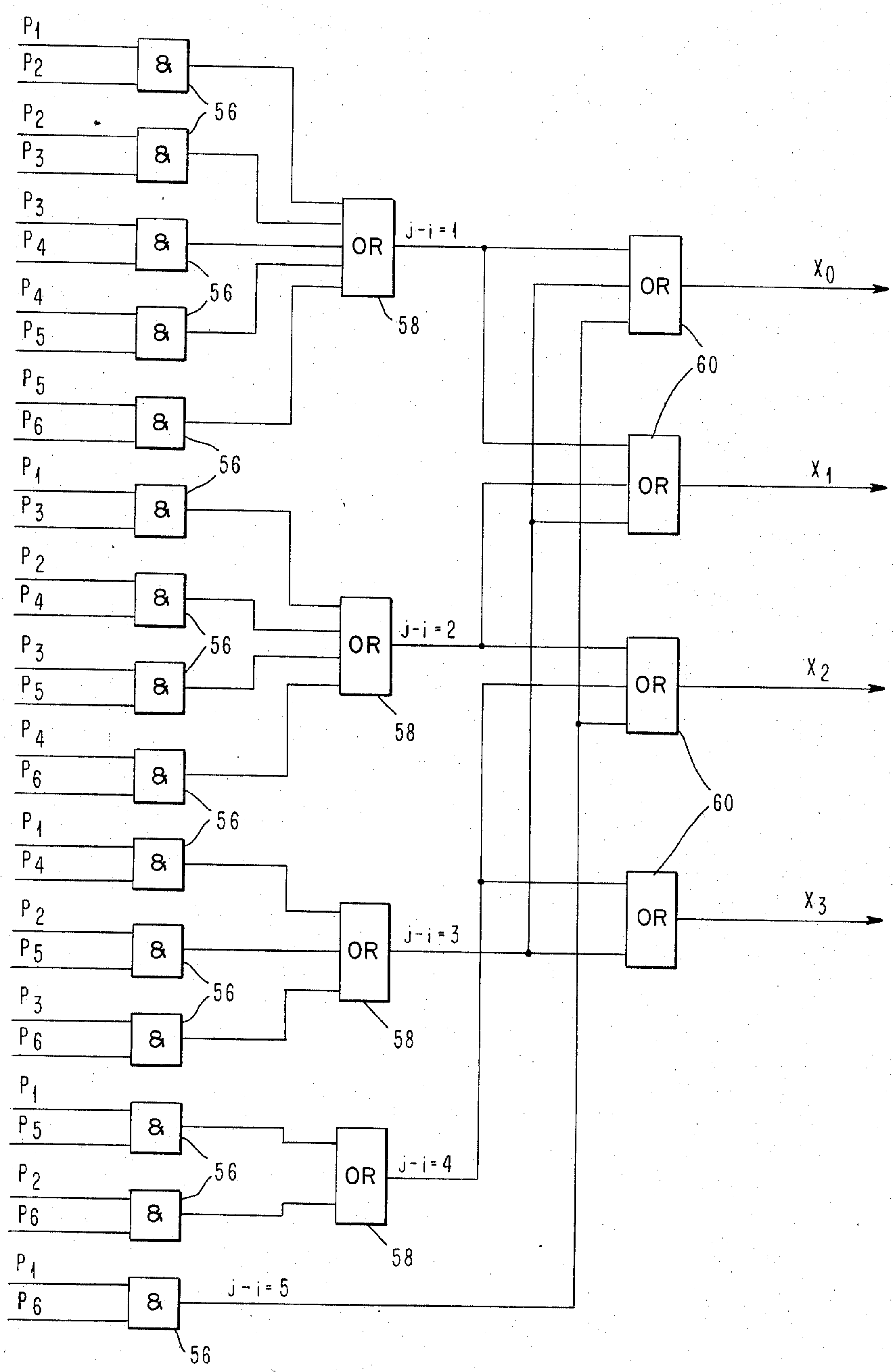
Figure 6D:
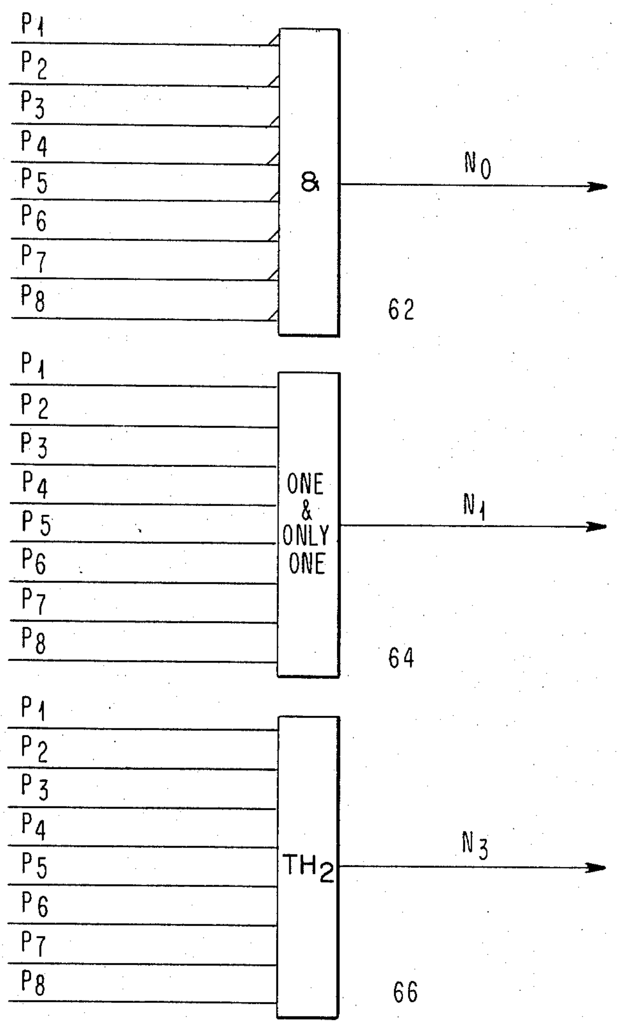
Figure 6:
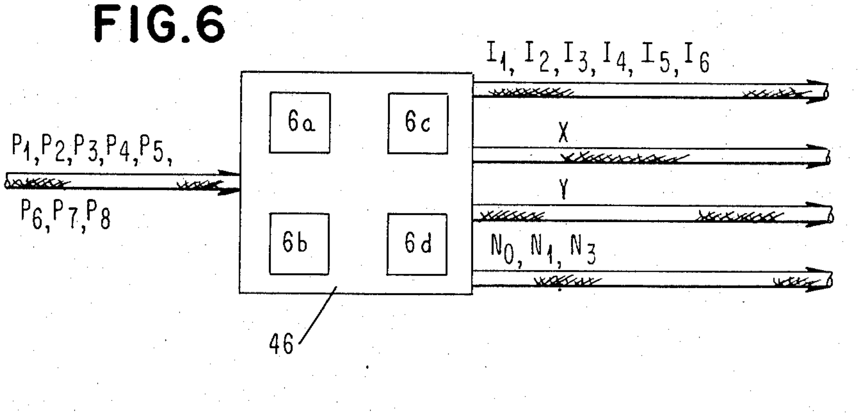

FIG. 6 shows schematically the error track parameters generator 46 which generates the parameters $x$ and $y$ as binary numbers from the input pointer signals $P_1$, $P_2$, . . . $P_k$, $P_{k+1}$, $P_{k+2}$. The error track parameters generator 46 also generates the new pointers $I_1$, $I_2$, . . . $I_k$ identifying the first erroneous data track which is called the Ith track. It also generates the signals $N_0$, $N_1$, $N_3$, indicating respectively, 0, 1 and more than 2 tracks in error. The error track parameters generator 46 of FIG. 6 indicates that the logic circuits 6$a$, 6$b$, 6$c$ and 6$d$ are included in order to obtain the above-noted outputs.

Referring to FIG. 6$a$, there is shown the logic network connections for generating the I pointers $I_1$ . . . $I_6$ which identifies the first erroneous data track called the Ith track. Combinations of the pointer signals $P_1$ . . . $P_6$ are utilized as inputs to AND circuits 50. The combinations are arranged in successively increasing order of 1. For example, the grouping is $P_1$, then $P_1$, $P_2$ followed by $P_1$, $P_2$, $P_3$, etc. It should be observed that all of the inputs except the additional input in each of the combinations is inverted in a NOT circuit at the inputs to the respective AND circuits 50. It can be seen that as long as all the pointer inputs are 0, there will be no output from any of the AND circuits. However, the first non-zero pointer signal will be indicated by an output from its corresponding AND circuit. That is, the AND circuit 50 having that pointer as the additional pointer input.

FIG. 6$b$ has as inputs the I pointers generated in FIG. 6$a$. This circuit generates the $y$ parameters as a $b$-bit binary number $y_3$, $y_2$, $y_1$, $y_0$. The input combinations of the I pointers is determined according to Table 3. The logic connections can be determined by retabulating $y$ as a $b$-bit binary number with the corresponding I pointers as shown in Table 3.

Table 3. Parameter $y$ as a binary member

| | | | $y$ as binary number | | | |
|---|---|---|---|---|---|---|
| $i$ | Indicated by | $y$ | $y_3$ | $y_2$ | $y_1$ | $y_0$ |
| 1 | $I_1$ | 14 | 1 | 1 | 1 | 0 |
| 2 | $I_2$ | 13 | 1 | 1 | 0 | 1 |
| 3 | $I_3$ | 12 | 1 | 1 | 0 | 0 |
| 4 | $I_4$ | 11 | 1 | 0 | 1 | 1 |
| 5 | $I_5$ | 10 | 1 | 0 | 1 | 0 |
| 6 | $I_6$ | 9 | 1 | 0 | 0 | 1 |

Therefore, the signals $y_3$, $y_2$, $y_1$ and $y_0$ are generated from $I_1$, $I_2$, . . . $I_6$. The input I pointer signals are combined into three groups of three and then a group of all six. These are inputted to OR circuits 52 which produce the $y$ parameter outputs. It will be appreciated that $y_3$ is always a logical one when any of the I signals is logical 1. $y_2$ is a logical 1 when $I_1$ or $I_2$ or $I_3$ is a logical 1. $y_0$ is a logical 1 when $I_2$ or $I_4$ or $I_6$ is a logical 1.

FIG. 6$c$ shows a logic circuit diagram which generates the $x$ parameter as a $b$-bit binary number $x_3$, $x_2$, $x_1$, $x_0$ from the P pointers. Before the $x$ parameter can be generated, the $(j-i)$ values must be generated from the track pointers $P_1$, $P_2$, . . . $P_6$. This is accomplished by combining the P pointers into pairs of inputs to separate AND circuits 56. It can be seen that the input paired arrangement of pointers has the first group of pairs separated by the value 1, while the second group of pairs is separated by the value 2, the third group by the value 3, the fourth group by the value 4 and the last pair by the value 5. Each of these P pointer pairs is fed to respective AND circuits 56 whose outputs are inputted to appropriate OR circuits 58 to obtain the appropriate $j-i$ value. For example, $j-i = 1$ is obtained from the OR circuit 58 connected to the AND circuits 56 having as inputs thereto the pairs separated by 1. Similarly, the other OR circuits 58 have connections thereto based on similar properties. For example, the second OR circuit 58 has an output value $j-i = 2$, while the third has a value $j-i = 3$ and the fourth has a value $j-i = 4$. Each of these $j-i$ values are connected to the appropriate OR circuits 60. The connections for the associated functions are determined by means of Table 4 which is derived from Table 1. The procedure is similar to that in generating the connections for the previous parameter. The parameter $x$ then is obtained as a $b$-bit binary number with signals $x_3$, $x_2$, $x_1$, $x_0$.

Table 4. Parameter x as a binary number

| | | x as a binary number | | | | |
|---|---|---|---|---|---|---|
| $j-i$ | Function | $x$ | $x_3$ | $x_2$ | $x_1$ | $x$ |
| 0 or $j$=7 | $N_1+P_7$ | 0 | 0 | 0 | 0 | 0 |
| 1 | $P_1P_2+P_2P_3+P_3P_4+P_4P_5+P_5P_6$ | 3 | 0 | 0 | 1 | 1 |
| 2 | $P_1P_3+P_2P_4+P_3P_5+P_4p_6$ | 6 | 0 | 1 | 1 | 0 |
| 3 | $P_1P_4+P_2P_5+P_3p_6$ | 11 | 1 | 0 | 1 | 1 |
| 4 | $P_1P_5+P_2P_6$ | 12 | 1 | 1 | 0 | 0 |
| 5 | $P_1P_6$ | 5 | 0 | 1 | 0 | 1 |

Note that $P_{k+2}$ does not participate in the determination of the values $j-i$. Also, $j-i = 0$ or $j = k+2$ does not generate logical 1 on any of the $x_0$, $x_1$, $x_2$, $x_3$ signal outputs.

FIG. 6d shows the circuit arrangement for generating the control signals $N_0$, $N_1$ and $N_3$. $N_0$ indicates that none of the track pointers $P_1$, $P_2$, . . . $P_{k+2}$ are on. $N_1$ indicates only 1 is on. $N_3$ indicates that more than two track pointers are on. The $N_0$ signal is generated as an output from an AND circuit 62 having the 8 pointer signals $P_1$ . . . $P_8$ as inputs thereto. It can be seen that any one of the pointer inputs being on will cause no output from the AND circuit 62. Thus, the absence of $N_0$ indicates that there is an energized track pointer. The $N_1$ output is obtained from a 'one and only one' circuit 64 which likewise has the pointers $P_1$ through $P_8$ as inputs thereto. The output $N_1$ will only by obtained from circuit 64 when only one of the pointer inputs thereto is energized. The output $N_3$ is obtained from a threshold network 66 which provides a logical one output when more than two of the inputs have logical 1's.

Referring to FIG. 7, there is shown the error corrector circuit 68 which produces the corrected data bytes $\hat{Z}_1$, $\hat{Z}_2$, . . . $\hat{Z}_k$ by combining the read data bytes $Z_1'$, $Z_2'$, . . . $Z_k'$, the error pattern byte $e_j$ and the pointer signals $I_1$, . . . $I_k$ and $P_1$ . . . $P_k$. The combining is done in accordance with the equations (21) and (22). These two equations are interpreted as follows.

If $j = k + 2$, i.e., the pointer $P_{k+2}$ is on, then $e_j$ the output of SR2 should be inhibited. The inhibiting is done by AND gates (switch SW3) as shown in FIG. 3. Otherwise, $e_j$ is added (modulo 2) to the erroneous read bytes and $S_1$ is added to the first erroneous read byte. This is accomplished by a set of 8 modulo 2 summing networks 70 and 2 sets of 8 AND gates 72,74 for each data byte $Z_1'$, $Z_2'$, $Z_3'$, $Z_4'$, $Z_5'$, $Z_6'$ as shown in FIG. 7. The first set of 8 AND gates 72 acts like a normally closed gate controlled by the corresponding track pointer signal and passes the $e_j$ byte only when that track pointer is on. The second set of 8 AND gates 74 are controlled by the corresponding I signal and pass syndrome $S_1$ only when that I pointer is on. The set of 8 modulo 2 summing networks 70 combine the input signals $Z_i'$, $e_j$ and $S_1$ to produce the corrected byte $\hat{Z}_i$.

Referring to FIG. 8, there is shown the uncorrectable error indicator logic circuit 80 for detection of a large percentage of uncorrectable errors. This circuit generates an error indicator signal E when one of the following happens:

1. $N_3$ is on indicating more than two tracks are in error. This can be seen from the $N_3$ input to the last OR circuit 81.

2. $N_1$ is on indicating that only one track is in error and that $e_j$, the output of SR2, is not 0 in all bit positions. This is accomplished by having $N_1$ and $e_j \neq 0$ signals as inputs to an AND circuit 82, the output of which forms one of the inputs to the OR circuit 81. The $e_j \neq 0$ signal is generated by an OR circuit 83 which receives all of the $e_j$ bits as its input.

3. $N_0$ is on indicating that no track is in error when $e_j$, the output of SR2, or $S_1$, the output of SR1, is not 0 in all bit positions. This is accomplished by deriving an $S_1 \neq 0$ signal from OR circuit 85 which has all the bits of $S_1$ as inputs thereto. The $S_1 \neq 0$ signal is applied as an input to AND circuit 84 along with the $N_0$ input. The AND circuit 84 output is connected to OR circuit 81. The $e_j \neq 0$ signal and the $N_0$ signal are connected as inputs to an AND circuit 86 whose output forms another input connection to OR circuit 81. Thus, any one of the inputs $N_0$, $N_1$ and $N_3$, under the conditions enumerated above, produces an output signal E from OR circuit 81 indicating detection of uncorrectable errors.

While the invention has been particularly shown and described with reference to a preferred embodiment thereof, it will be understood by those skilled in the art that the foregoing and other changes in form and detail may be made therein without departing from the spirit and scope of the invention.

What is claimed is:

1. A system for correcting two tracks in error in a multi-track data arrangement, comprising:

means for providing message data $Z_1$, $Z_2$, $Z_3$, . . . $Z_k$ arranged in blocks having $k$ bytes arranged in a cross track direction, each byte having $f$ bits of data where $f = b \times m$ where $b$ and $m$ are integers >1 and $k$ is an integer $2<k<2^b$;

means connected to said means for providing message data for generating two check bytes from said message data in accordance with the equations:

$$C_1 = Z_1 \oplus Z_2 \oplus Z_3 \ldots \oplus Z_k$$

and $$C_2 = T^{\lambda} \quad Z_1 \oplus T^{2\lambda} \quad Z_2 \oplus \ldots \oplus T^{k\lambda} \quad Z_k$$

where $T$ is the companion matrix of a binary primitive polynomial $g(x)$ of degree $f$ and $\lambda$ is any integer given by the expression $t(2^b-1)/(2^b-1)$ in which $t$ is any positive integer prime to $2^b-1$;

means connected to said means for providing message data and to said means for generating two check bytes for appending said two check bytes to said message data to form an encoded message;

means connected to said means for appending said two check bytes to said message data for utilizing said encoded message;

means connected to said utilization means for decoding said encoded message denoted by $Z_1'$, $Z_2'$, . . . $Z_k'$, $C_1'$, $C_2'$; said decoding means including first and second shift registers for generating first and second syndromes $S_1$ and $S_2$ from said encoded message in accordance with the equations:

$$S_1 = C_1' \oplus Z_1' \; Z_2' \oplus \ldots \oplus Z_k'$$

and $$S_2 = C_2' \oplus T^{\lambda} \quad Z_1' \oplus T^{2\lambda} \quad Z_2' \oplus \ldots \oplus T^{k\lambda} \quad Z_k'$$

means for providing error track pointer signals as inputs to said decoder which identify the tracks in error;

error track parameters signal generating means connected to said means for providing error track pointer signals for providing fixed signals in accordance with the tracks indicated to be in error;

means connected to said error track parameters signal generating means for generating control signals for the operation of said decoder; and error correcting means connected to said first and second shift registers, to said means for providing identifying signals, to said means for providing control signals, and to said utilization means for providing error correction of the erroneous bytes in any two indicated tracks in error.

2. A system according to claim 1, wherein said means for generating said two check bytes includes a data distributor and first and second feedback shift registers connected to said data distributor, said first shift register providing modulo 2 addition of the information bytes successively applied thereto from said data distributor and said second shift register providing the product of the contents thereof and the incoming byte from said data distributor and the modulo 2 addition thereof with the product of the contents thereof and the next input byte.

3. A system according to claim 2, wherein said second feedback shift register has $f$ data stages and a modulo 2 summing circuit at the input to each stage, the feedback connections of each of said stages of said feedback shift register are determined in accordance with the digital "1" contents of the corresponding column of the matrix $T_f^{\lambda}$ , the positions of the 1's in the column determining feedback connections to the modulo 2 summing circuits at the inputs of the shift register stages having corresponding numerical positions in said feedback shift register.

4. A system according to claim 1, wherein said error track parameters signal generating means receives error track pointer signals $P_1$, $P_2$, . . . $P_k$, $P_{k+1}$, $P_{k+2}$ from said means for providing error track pointer signals and generates parameters $x$ and $y$ as binary numbers, new pointers $I_1$, $I_2$, . . . $I_k$ identifying the first erroneous data track, and the signals $N_0$, $N_1$ and $N_3$ indicating respectively, 0, 1 and more than 2 tracks in error.

5. A system according to claim 4, wherein said error track parameters signal generating means includes a plurality of logical AND and NOT circuits having as inputs thereto the track in error pointer signals $P_1$, $P_2$, . . . $P_k$ from said means for providing pointer signals arranged in groups of increasing order by a pointer value of 1 starting with $P_1$, $P_1P_2$, $P_1P_2P_3$, . . . $P_1P_2P_3$ . . . $P_k$, all the pointer signals except the additional pointer signal in each group being connected through one of said NOT circuits so that an output $I_i$ is obtained from the AND circuit in which the additional pointer signal has a "1" input thereby identifying the first data track in error.

6. A system according to claim 5, wherein said error track parameters signal generating means further includes a first plurality of OR circuits, said $I_i$ signals identifying the first track in error are grouped as inputs to said first plurality of OR circuits, the grouping is predetermined in accordance with a table wherein the output $y$ parameter is obtained as a predetermined $b$-bit binary number.

7. A system according to claim 4, wherein said error track parameters signal generating means, further includes a second plurality of AND circuits and a second and third plurality of OR circuits said second plurality of AND circuits having error track pointer signals as inputs thereto arranged in groups of pairs, said pairs of said first group being all possible adjacent pairs, said pairs of said second group being all possible pairs separated by one error track pointer signal input, said pairs of said third group being all possible pairs separated by two error track pointer signal inputs, said pairs of said $k^{th}$ group being all possible pairs separated by $k-1$ error track pointer signal inputs, the outputs of each of said groups of second plurality of AND circuits are connected to respective ones of said second plurality of OR circuits whose outputs correspond to the $j-i = 1$ to the $j-i = k-1$ value; each of the $j-i$ value outputs being connected as inputs to said third plurality of OR circuits, the connections being determined in accordance with a predetermined table giving said $x$ parameter as a $b$-bit binary number.

8. A system in accordance with claim 4, wherein said error track parameters signal generating means further includes a combination of a plurality of NOT circuits connected to an AND circuit, a 'one and only one' circuit, and a threshold circuit, each of said circuits having the error track parameters signals from said error track parameters signal generating means as inputs thereto and having said signals $N_0$, $N_1$ and $N_3$ as outputs therefrom, respectively, representing 0, 1 and more than two tracks in error.

9. A system in accordance with claim 4, wherein said means for generating control signals includes counting means which are energized to count down simultaneously with the shift signal for said shift registers SR1 and SR2;

means for setting said counting means to the binary value of $x$ generated by said error track parameters signal generating means and counting down to 0 in synchronism with the shifting of SR1 and SR2 to introduce the parameter $y$ into the error pattern $e_j$ computation which is computed from the syndromes $S_1$ and $S_2$ according to:

$$e_j = T^{x\lambda} \quad [S_1 \oplus T^{y\lambda} \quad S_2].$$

10. A system according to claim 9, wherein inhibiting means are provided connected to the output of shift register SR2 for inhibiting the $e_j$ output when $j = k+2$ and pointer $P_{k+2}$ is on indicating the $k+2$ track is in error.

11. A system according to claim 10, wherein said error correcting means includes means for adding (modulo 2) error pattern $e_j$, erroneous read bytes $Z_1'$, $Z_2'$, . . . $Z_k'$ and syndrome $S_1$ to obtain the corrected bytes $\hat{Z}_1$, $\hat{Z}_2$, . . . $\hat{Z}_k$.

12. A system according to claim 4, wherein said decoding means further includes an uncorrectable error indicating circuit connected to said error track parameters signal generating means which provides said $N_0$, $N_1$, and $N_3$ signals, and to said shift registers SR1 and SR2 which provide syndrome $S_1$ and error pattern $e_j$ signals, respectively; said $N_3$ signal indicating that more than two tracks are in error, and said $N_1$ signal indicating that only one track is in error and that $e_j$ is not 0 in all bit positions, and said $N_0$ signal indicating that no track is in error when $e_j$ or $S_1$ is not 0 in all bit positions.

* * * * *